United States Patent [19]

Oparin et al.

[11] Patent Number: 5,592,582
[45] Date of Patent: Jan. 7, 1997

[54] BEAM MACHINING DEVICE WITH HEATING LAMP AND SEGMENTED REFLECTOR SURFACE

[75] Inventors: Mikhail I. Oparin; Mikhail T. Borisov; Georgy M. Alexeev, all of Moscow, Russian Federation

[73] Assignees: Nauchno-Proizvodstvennya Firma "Adonia"; Nauchno-Proizvodstvennya Firma "MGM", both of Vidnoe, Russian Federation

[21] Appl. No.: 351,299

[22] PCT Filed: Jul. 6, 1993

[86] PCT No.: PCT/RU93/00158

§ 371 Date: Feb. 16, 1995

§ 102(e) Date: Feb. 16, 1995

[87] PCT Pub. No.: WO94/24586

PCT Pub. Date: Oct. 27, 1994

[30] Foreign Application Priority Data

Mar. 30, 1993 [RU] Russian Federation ............. 93016356

[51] Int. Cl.⁶ ................................ G02B 5/10; F21V 7/09
[52] U.S. Cl. ...................... 392/421; 250/504 R; 313/114; 362/304; 362/346
[58] Field of Search ...................... 392/419–421, 392/422, 424, 412, 413, 415, 430, 431, 411, 416; 219/405, 411, 85.12, 85.13; 250/504 R; 362/297, 302, 304, 346, 261, 305; 313/113–114

[56] References Cited

U.S. PATENT DOCUMENTS

| 3,784,836 | 1/1974 | Tolliver | 392/421 |
| 3,801,773 | 4/1974 | Matsumi | 392/420 |
| 4,106,083 | 8/1978 | Wolff | 392/422 |
| 5,038,395 | 8/1991 | Lenski | 392/420 |

FOREIGN PATENT DOCUMENTS

| 645648 | 3/1995 | European Pat. Off. . | |
| 653648 | 5/1995 | European Pat. Off. . | |
| 3-184287 | 8/1991 | Japan | 392/421 |
| 264814 | 12/1927 | United Kingdom | 392/421 |
| 1110073 | 4/1968 | United Kingdom | 392/421 |
| 2225549 | 6/1990 | United Kingdom | 392/421 |
| 9409312 | 4/1994 | WIPO . | |

*Primary Examiner*—John A. Jeffery
*Attorney, Agent, or Firm*—Gary M. Nath; Nath & Associates

[57] ABSTRACT

A device for beam machining comprises an extended radiation source (1) and a concentrating reflector (2) whose reflecting surface has the form of a surface of revolution made up of several successively-joined segments (3). The shape of the reflector generating surface on any segment except the initial one located near the apex M of the reflector (2) and the boundaries between the joined segments are defined by a system of equiations. The initial segment of the profile of the reflector (2) extending from its apex M to the profile points $R_1$, $z_1$ has the shape of a segment of the curve of the 2nd order. Installed on the end of the concentrating reflector is a pressuretight protective transparent partition (4) whose cross-sectional profile is capable of ensuring additional focusing of preset radiation fractions of the linear source (1) in the focal point F.

2 Claims, 1 Drawing Sheet

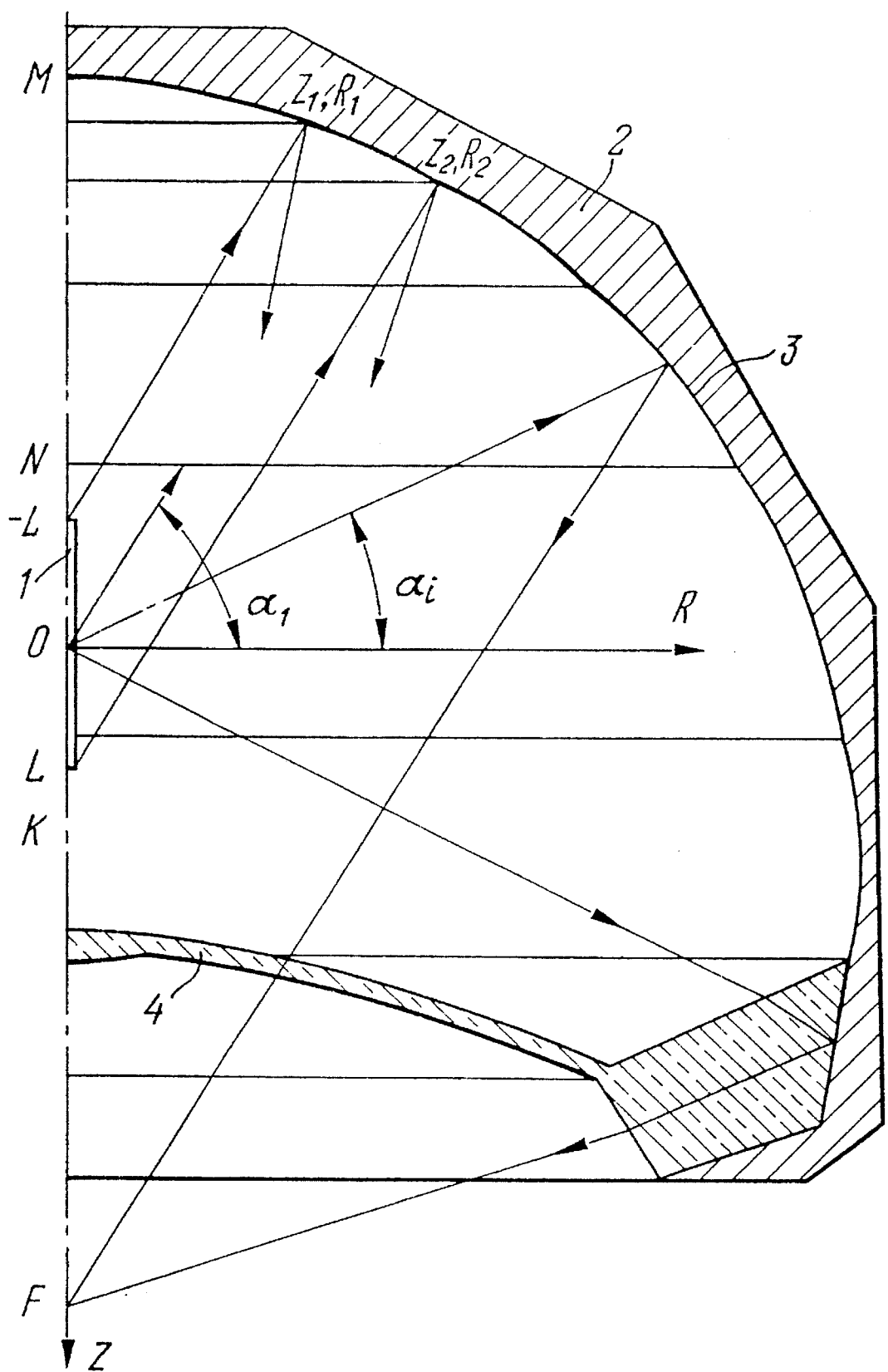

BEAM MACHINING DEVICE WITH HEATING LAMP AND SEGMENTED REFLECTOR SURFACE

FIELD OF ART

The present invention relates to illumination engineering, particularly to technical means for concentration of optical radiation and can prove useful in solving the problems of heat treatment of materials including development of means for soldering and welding of sheet materials. It is practicable to use the disclosed device for body repairs of motor vehicles, welding and soldering difficult conditions, applying some kinds of coatings to the surface of sheet materials, in roofing work, etc.

PRIOR ART

Known in the prior art is a beam machining device comprising a reflector and an extended source of radiation arranged along the optical axis of said reflector wherein the reflecting surface has a profile described by the equation:

$$\frac{dy}{dx} = -tg\left[0.25\left(\text{arctg}\frac{X}{y-L} + \text{arctg}\frac{X}{y+L} + 2\text{arctg}\frac{X}{y+h}\right)\right],$$

where x,y—coordinates of reflector profile,
2L—length of radiation source,
h—distance from center of source to center of irradiation zone (USSR Inventor's Certificate No.1227908 IPC-5: F-21V 7/04 of 19.12.83). A disadvantage of said device lies in a relatively low illumination intensity of the irradiation zone which is caused by the absence in this geometry of the reflector of at least one direction of radiation of a linear source for which radiation would be collected into a focal point.

Another known beam machining device comprises an extended source of radiation and a concentrating reflector made up of several segments, the surface shape of at least two of them being characterized by the expressions:

$$\begin{cases} X\,tg\,\phi_m - L/2 \leq y \leq X\,tg\,\phi_m + L/2 \\ \frac{dy}{dx} = -tg\frac{1}{2}\left(\text{arctg}\frac{X}{y+h} + \phi_m\right) \end{cases}$$

for y>0, and $$\begin{cases} -X\,tg\,\phi_m - L/2 \leq y \leq -X\,tg\,\phi_m + L/2 \\ \frac{dy}{dx} = tg\frac{1}{2}\left(\text{arctg}\frac{X}{y+h} - \phi_m + \pi\right) \end{cases}$$

for y<0 where x,y—coordinates of the profile of reflector surface, L—length of the radiating segment of the source, h—distance from the center of the source to the irradiation zone, and $\phi_m$ is the radiation angle of the source corresponding to maximum brightness. The other elements of the reflector surface are constituted by conjugated elements of ellipsoids of revolution (USSR Inventor's Certificate No.1081605 IPC-5:G21B 5/10 of 21.12.82). Another disadvantage of this technical solution lies in a low illuminating intensity of the machining zone ensuing from the fact that, on the one hand, the number of radiation directions along which the radiation of the linear source is collected in one point is limited by the number of maximums of the radiation indicator and, on the other hand, there is no indication of the interrelation between the size of the radiation source, its position in the radiating region and the surface profile of the concentrating reflector. Besides, the optical characteristics of the reflector deteriorate with time due to dusting of its surface with the products formed during beam machining operation.

DISCLOSURE OF THE INVENTION

The main object of the invention resides in providing a device for beam machining capable of producing a higher illuminating intensity of the surface of the treated material and improving the stability of optical properties of the reflector.

The essence of the invention lies in that in the beam machining device comprising an extended source of radiation and a concentrating reflector whose reflecting surface is a surface of revolution whose generatrix is composed of several successively-joined seegments, said generatrix on a certain segment, and the boundaries between the segments are defined by a system of equations.

$$\begin{cases} \frac{dR}{dz} = tg\frac{1}{2}\left(-\alpha_i + \text{arctg}\frac{F-z}{R}\right), \\ \alpha_i = \text{arctg}\frac{z_i + L}{R_i}, \\ \frac{z_{i+1} - L}{R_{i+1}} = tg\,\alpha_i, \end{cases}$$

where R z—radial and axial coordinates of the surface profile of the i-th segment of the reflector in the cylindrical system of coordinates with the beginning in the middle of the linear radiation source with a length of 2L; $R_i$, $z_i$—coordinates of the conjugation points of adjacent segments of the reflector profile indicated by numerals i−1 and i (i−1,2, 3 ... ); F—axial coordinate of radiation focusing point; the initial segment of the reflector profile from its apex to the point $R_1$, $z_1$ is made as a segment of the curve of the 3nd order with a curvature radius at the apex ρ meeting the condition:

L−M<ρ<−2 (L+M), where M—axial coordinate of the reflector apex.

Installed and hermetically sealed on the face end of the concentrating reflector is a transparent protective partition whose cross-sectional profile provides for additional focusing of the preset radiation fractions of the linear source.

The number of reflecting segments depends on the relation of demensions of the linear radiation source and axial section of the concentrating reflector. If the length of the linear source is small in comparison with the distance from its location to the point of radiation focusing, the suggested system of equations produces an elliptical surface with foci in the locations of the source and the segment of the machined surface. Increased relative dimensions of the linear radiation source reduce the number of directions along which the radiation of the linear source is focused. A particular technical solution appears to be a compromise between the value of energetic illuminance of the machined surface and the overall dimensions of the device and proves to be more efficient than the known devices at the same time having a sufficiently large number of segments of the reflecting surface.

BRIEF DESCRIPTION OF THE DRAWINGS

Now the invention will be described in detail by way of its concrete embodiment with reference to the FIGURE which shows an example of realization of the device for beam machining of materials.

EMBODIMENTS OF THE INVENTION

The device comprises a radiation source 1 with a linear radiating region combined with the axis of a concentrating reflector 2 whose reflecting surface has the form of a surface of revolution with its generatrix made up of a succession of segments 3 each having a shape which ensures the collection of radiation emitted in a certain direction $\alpha_i$ in the point matching with the machined surface and having its coordinate F directed along the z axis. Installed in a pressuretight manner on the end of the concentrating reflector is a radiation-transparent partition 4 whose cross-sectional profile may be of a varying thickness for additional focusing of radiation from the linear source.

The device functions as follows. Radiation of the source 1 propagated along direction $\alpha$ is reflected by the surface of the concentrating reflector 2 towards the focal point F. If the radiation angle in the direction of the 1-th segment 3 of the reflector $\alpha_i$ and the generatrix of the surface of revolution on this segment satisfy the relations $$\begin{cases} \frac{dR}{dZ} = tg\frac{1}{2}\left(-\alpha_i + arctg\frac{F-z}{R}\right), \\ \alpha_i = arctg\frac{z_i+L}{R_i}, \end{cases} \quad (1)$$

then the radiation of the linear light source propagated in this direction is focused in the focal point with coordinate F which is coincident with the surface of the machined material. The initial segment 3 of the surface of the reflector 2 located at its apex has a generatrix in the form of a curve of the 2nd order, e.g. a circle having such a radius of curvature that the linear radiation source with a length 2nd is disposed in the interval between the center of this circle K and the point N in the middle of the segment between the center of circle K and the axep of the reflector M. The concrete value of the curvature radius of the reflector initial segment is taken on the basis of the requirements for the size of the device, power of light source and the technological process in hand. Selection of the point with coordinates $z_1$ and $R_1$ on the initial segment 3 of the generatrix of the surface of the concentrating reflector 2 defines the entire generatrix of the surface of the concentrating reflector. In accordance with (1) the setting of $z_1$ and $R_1$ determines the angle $\alpha_1$ and the initial conditions of the differential equation of the generatrix of the surface of revolution. The coordinates of the terminal point of the first segment 3 of the reflector $z_2$, $R_2$ are defined by the joint solution of the differential equation (1) and the equation $$\frac{z_{i+1}-L}{R_{i+1}} = tg\,\alpha_1$$

where i=1. The same point $z_2$, $R_2$ is the initial one for the second segment, etc. This procedure is repeated as long as necessary for obtaining the value of $z_{i+1}$ which is sufficiently close to the local point F. An additional contribution to the radiant flux in the focal region can be made by using the protective partition 4 as an optical element. For this purpose the section profile of the partition 4 is made with a varying thickness for focusing the selected fraction of radiation. For example, the peripheral part of the partition 4 shown in the appended drawing is shaped after the Fresnel lens for further enlargement of the radiation collection angle while its central part has the form of a thin lens for utilization of the axial radiant flux. Should it be necessary to reduce the axial length of the device, the transparent partition may take the form of a focuser. (see, for example, A. V. Goncharsky et al. Introduction into computer optics. Moscow University Publishers M., 1991, pp 236–264).

Realization of the concentrating reflector of the beam machining device in the form of a surface of revolution with its generatrix consisting of several segments whose shape is defined by equations (1) and (2) will increase the density of the optical radiation flux in the local plane which will afford additional possibilities in selecting the available technologies. Introduction of a transparent pressuretight partition will protect the reflector surface against the products emitted during the technological process and will permit using a neutral medium in the reflector space thus extending the service life of the reflector and lamp. Besides, the varying thickness of the protective partition will afford additional additional opportunities in increasing the density of optical radiation flux in the focal plane.

COMMERCIAL APPLICABILITY

The device can be used for all kinds of soldering, welding and heat treatment of surfaces, including application of protective coatings. The absence of combustion products and electric arc sometimes ensures the performance of technological operations unrealizable by other devices. The greatest effect is attained by the disclosed device in automotive industry for manufacture and repairs of body parts, in civil engineering, manufacture and repairs of metal roofing and in other fields calling for the use of convenient and safe equipment for joining and treating sheet materials.

We claim:

1. A beam machining device comprising an extended radiation source and a concentrating reflector with a reflecting surface in the form of a surface of revolution whose generatrix in made up of several successively-joined segments characterized in that the shape of the reflector generating surface for any segment except the one adjoining the apex as well as boundaries between the joined segments are defined by a system of equations:

$$\begin{cases} \frac{dR}{dZ} = tg\frac{1}{2}\left(-\alpha_1 + arctg\frac{F-z}{R}\right), \\ \alpha_i = arctg\frac{z_i+L}{R_i}, \\ \frac{z_{i+1}-L}{R_{i+1}} = tg\,\alpha_1, \end{cases}$$

where R, z—radial and axial coordinates of the surface profile of reflector's i-th segment in the cylindrical system of coordinates with its center in the middle of the linear radiation source 2L long; $R_i$, $z_i$—coordinates of the joining points of adjacent segments of reflector profile designated by numbers i–1 and i (i=1, 2, 3, ... ); F—axial coordinate of the radiation focusing point; the initial segment of the reflector profile from its apex to the point of the profile $R_1$, $z_1$ is made in the form of a segment of the curve of 2nd order with a curvature radius ρ satisfying the condition:

$$L-M < \rho < -2(L+M),$$

where M—axial coordinate of reflector apex.

2. The device for beam machining of claim 1 characterized in that the end of the concentrating reflector is provided with a pressuretight protective transparent partition whose cross-sectional profile is capable of ensuring an additional focusing of preset three-dimensional radiation fractions of the linear source.

* * * * *